Nov. 25, 1924.

H. B. SCOTT 1,517,175

TOOL HOLDER AND STEADY REST

Filed July 14, 1920    2 Sheets-Sheet 1

Inventor

Harry B. Scott.

Nov. 25, 1924.
H. B. SCOTT
1,517,175
TOOL HOLDER AND STEADY REST
Filed July 14, 1920    2 Sheets-Sheet 2
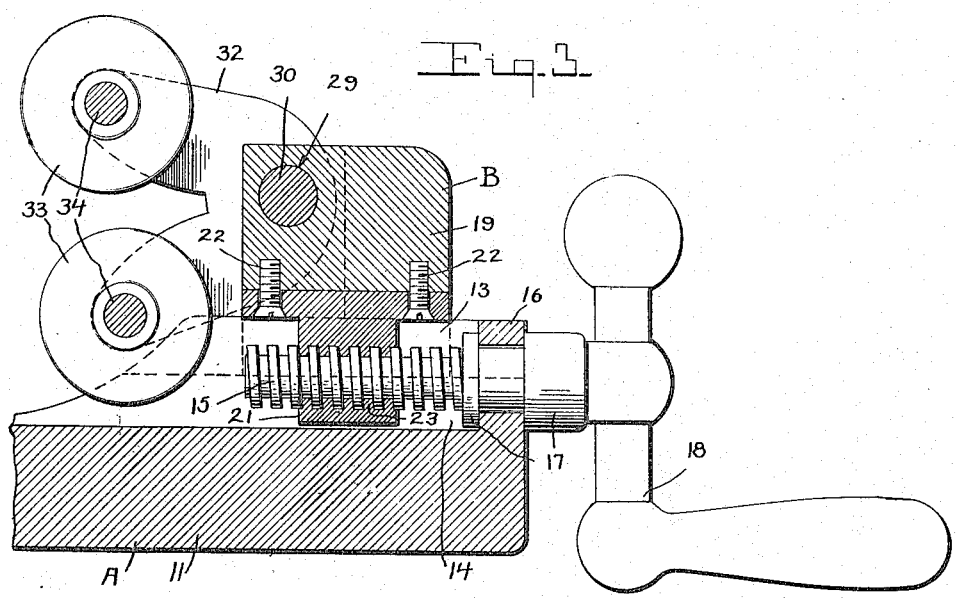
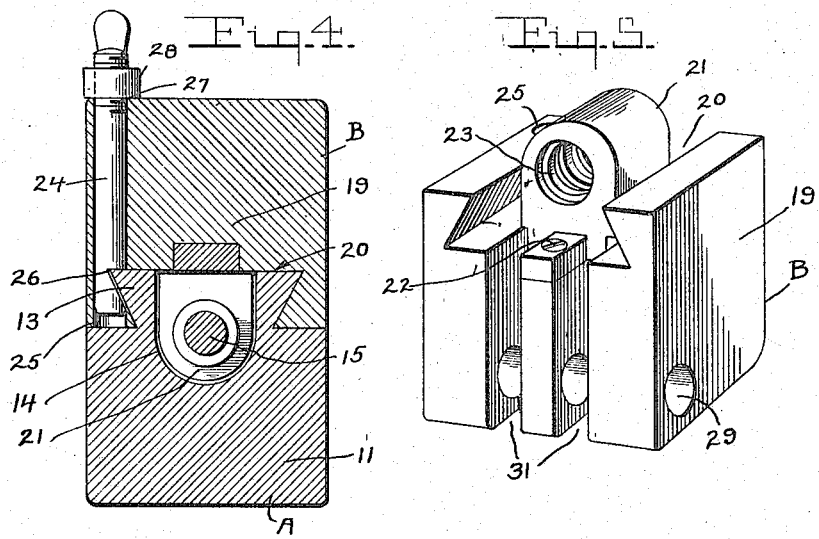
Inventor
Harry B. Scott Patented Nov. 25, 1924.

1,517,175

UNITED STATES PATENT OFFICE.

HARRY B. SCOTT, OF BARRE, VERMONT.

TOOL HOLDER AND STEADY REST.

Application filed July 14, 1920. Serial No. 396,249.

*To all whom it may concern:*

Be it known that I, HARRY B. SCOTT, a citizen of the United States, residing at Barre, in the county of Washington and State of Vermont, have invented certain new and useful Improvements in a Tool Holder and Steady Rest, of which the following is a specification.

My invention relates to an attachment designed to support and steady work while in a lathe or similar machine.

I aim to provide an attachment particularly adapted to support and steady small pieces while at the same time capable of use with any sized work the machine will accommodate.

In addition is a desideratum to produce an attachment capable of fastening with the cutting tool, in the usual tool holder of a lathe, and an article of this kind which is simple, durable, efficient, and capable of manufacture at low cost, possessing the novel combinations and details hereinafter specifically described and illustrated in accompanying drawings, wherein:

Figure 3 is a fragmentary longitudinal sectional view taken substantially on the line 3—3 of Figure 2;

Figure 4 is a cross-sectional view taken on the line 4—4 of Figure 2, and

Figure 5 is a detail perspective view of the carriage or movable block of the rest device.

Like characters of reference indicate like or similar parts throughout the views thereof.

Figure 1:
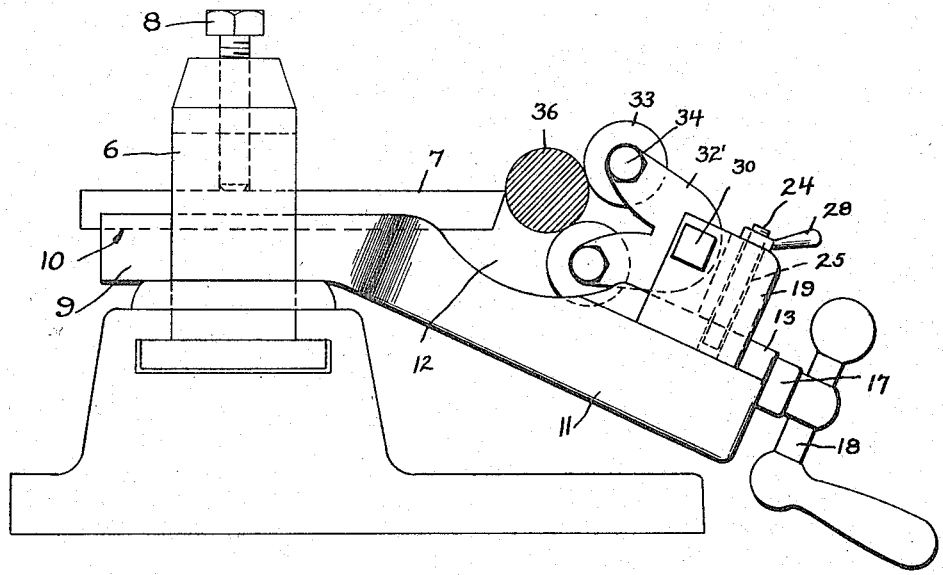
Figure 1 is a side elevation of my improvements fastened together with a cutting tool in an ordinary lathe tool holder.
Figure 2:
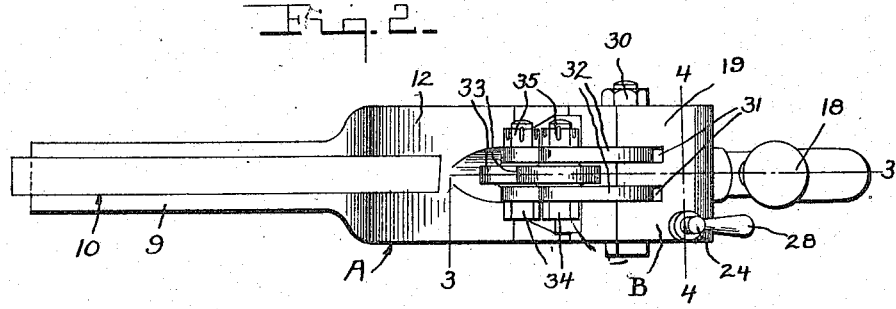
Figure 2 is a plan view of the attachment.

Referring specifically to the drawings, 6 represents a lathe tool holder which is to be taken as conventional since my improvements cooperate with the various types thereof. The cutting tool 7 passes through the opening thereof and is clamped in place by the usual screw 8. In this instance, however, an extension or arm 9 of a metallic supporting table or base A of my improvements, also passes through said slot and is clamped in place by said screw 8 since the tool 7 rests upon the arm. In addition, arm 9 is preferably grooved as at 10 so as to removably receive the tool 7 and steady it especially against sidewise or lateral motion.

Integral with arm 9 is a track portion 11, preferably inclined as shown, and cut away to provide clearance as at 12. Track 11 has a dove-tail rib 13 at the top and a longitudinal recess 14 extending inwardly from the top and rear and into which a screw 15 extends. This screw is mounted in a bearing 16 of the track member for rotation but against longitudinal movement by means of collars 17. A suitable manipulating handle or crank 18 is provided on the screw.

A carriage or block 19 of a rest device B slides on the track member, having an undercut groove 20 conforming in shape to and receiving the dove-tail rib 13 as best shown in Figure 4. Depending from block 19 is a boss 21, either integral with the block or separate as shown and fastened to it by means of screws 22. This boss is disposed in the recess 14 and has a bore through which the screw 15 passes and screw threads 23 therein to engage those of the screw so that turning of the screw will result in sliding the block.

A pin 24 is disposed in a recess 25 of head 19 and has a notch 26 receiving a portion of dovetail 13 as shown in Figure 4. This pin is provided with screw threads at 27 which receive threads of a nut or lever 28 which clamps against the top of block 19 to draw the pin upwardly to cause the pin at the notch 26 to bind against the dove-tail 13 to secure the block against accidental movement.

In an opening 29 of block or head 19 a pin or shaft 30 is fixed. Recesses 31 are also provided in head 19 in which bifurcated bearings 32 are disposed, being pivoted for vertical movement on the shaft 30. Between the arms of bearings 32, rollers 33, spaced from each other, are disposed being journaled on short shafts 34 keyed to the said arms. These shafts 34 may be bolts, and the nuts 35 thereof may be of a suitable lock type.

The work 36 is positioned against the rollers 33 in operation with the tool 7 and supporting table A fastened in post 6 as shown in Figure 1. The work of course is fastened in the lathe in the usual manner and my improvements are additional and serve as a support to render the work absolutely steady. Since the bearings 32 are pivoted they freely move to engage the work and since the rollers 33 are pivoted, undue friction between the same and the work is avoided. Crank 18 is manipulated so that the screw 15 will move the block 19 and accordingly the bearings 32 and rollers 33 relatively to the cutting tool and work. When these parts are in proper relation, nut or lever 28 is operated to cause the pin 24 to bind against dove-tail 13 to guard against accidental displacement of the block and associated parts.

Changes in the details may be resorted to within the spirit and scope of the following claims since I have shown but one embodiment.

I claim:—

1. In a device of the character described, the combination with a cutter holding clamp, of a base member adapted to be received in said clamp, of a block slidable upon said base, a V-shaped bearing member loosely pivoted at its apex to the block, and work engaging roller means pivoted upon the free ends of the V-shaped bearing member.

2. In a device of the character described, the combination with a cutter holding clamp, of a base member held by said clamp, a block slidable upon said base, a pair of V-shaped bearings pivoted to the block adjacent the front end of same, and work engaging roller means pivoted between said bearings.

3. In a device of the character described, the combination with a cutter holding clamp, of a base member adapted to be held by said clamp, a block slidable upon said base, V-shaped bearings pivoted to the block adjacent the front edge of same and spaced apart, and work engaging roller means pivoted to the ends of the V-shaped bearings.

In testimony whereof, I have affixed my signature in the presence of two witnesses.

HARRY B. SCOTT.

Witnesses:
J. WARD CARVER,
ERNEST H. BANCROFT.